Feb. 25, 1958      J. M. MACY      2,824,709
DISPENSER FOR FILAMENTARY MATERIAL
Filed Nov. 19, 1956
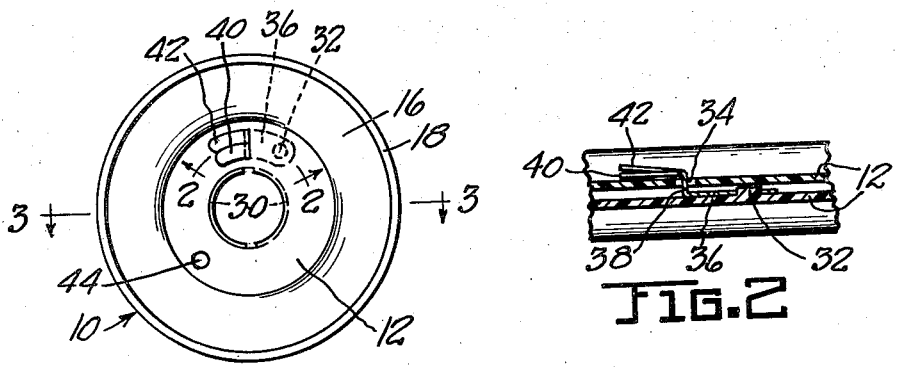
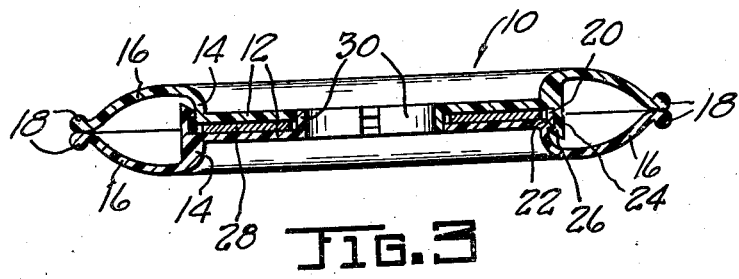
INVENTOR.
JOHN M. MACY
BY
Eugene C. Knoblock
ATTORNEY

United States Patent Office 2,824,709
Patented Feb. 25, 1958

2,824,709

DISPENSER FOR FILAMENTARY MATERIAL

John M. Macy, South Bend, Ind., assignor to South Bend Tackle Company, Inc., South Bend, Ind., a corporation of Indiana Application November 19, 1956, Serial No. 622,938

3 Claims. (Cl. 242—135)

This invention relates to improvements in dispensers for filamentary material such as threads, fishing lines, fishing leaders, synthetic filaments and the like.

The primary object of this invention is to provide a device of this character which is simple in construction, compact in size, which serves to retain the filamentary material against undesired release and to accommodate the discharge of a selected length only of the filamentary material, and which also provides self-contained means for severing the filamentary material to be dispensed so that it is not necessary to use any tool or element apart from the dispenser itself for the purpose of separating a selected length of a filament from the filament held by the device.

A further object is to provide a dispenser of this character having a pair of interconnected parts defining an annular chamber at its outer margin normally tensioned to closed position and having a recessed central portion serving to carry the base of a cutter member to locate said cutter in a central protected but readily accessible position convenient for use for the purpose of severing filamentary material withdrawn from the outer annular storage chamber.

A further object is to provide a device of this character formed of two interconnected parts cooperating to define a chamber of annular form for receiving and storing filamentary material, wherein one of said parts is formed of opaque material and the other of said parts is formed of a transparent material, said opaque material being of selected color which is visible in all positions in which the device is viewed by reason of the transparency of the one portion of the device.

Other objects will be apparent from the following specification.

In the drawing:

Fig. 1 is a face view of the device.

Fig. 2 is an enlarged fragmentary sectional detail view taken on line 2—2 of Fig. 1.

Fig. 3 is an enlarged sectional view taken on line 3—3 of Fig. 1.

Referring to the drawing, which illustrates the preferred embodiment of the invention, the numeral 10 designates a spool formed of two substantially similar complementary parts which are preferably formed of plastic material of either thermo-plastic or thermo-setting type, such as styrene or cellulose acetate. The two halves are preferably of substantially annular outline or shape and each thereof has an inner flat annular part 12, a circular or annular outwardly projecting shoulder portion 14, an outer annular portion 16 and an outer circular lip or rib 18. The two halves, or parts of the spool, are connected to form an assembled unit in the manner hereinafter described. One part will preferably be opaque and have a selected color, while the other part will preferably be of a clear or transparent material through which the colored or opaque part may be viewed when the latter is lowermost or opposite the eye. The color of the opaque section may be keyed according to any pre-selected schedule or code so as to refer to filamentary material of a predetermined type, quality or other specific property. Thus, if a user has the number of the items of different colors and different types of filaments, he is enabled by quick viewing of the devices to select the one which he desires bearing filamentary material of predetermined or selected properties by merely using the color of the device as a guide in making a selection.

Any suitable means may be provided for connecting the two parts of the device together in registering relation to define an annular outer chamber for the filamentary material by the parts 14, 16, 18 thereof. In the form illustrated, each of the parts has projections formed integrally therewith adjacent to shoulder portion 14 and constituting arcuate concentric flanges, each preferably less than 180 degrees in extent, or two or more sets of such arcuate flanges arranged in spaced relation and adapted to extend alternately around the circumference of the shoulder portion 14. One of the cooperating flanges is designated 20 and has an outer or large diameter part-cylindrical surface projecting outwardly, radially, with respect to the outer surface of the shoulder 14 of the part from which it projects, so as to define a shoulder 22. The flange 20 projects perpendicularly from the inner face of the inner annular part 12 of the section of the device with which it is formed to a slight extent only. Alternating with the flange 20 on each part is a flange 24 having an inner circumferential surface adapted to fit snugly around the outer surface of the flange 20 on a cooperating part, and also provided at its free edge with a hook portion 26 in the nature of an inwardly projecting rib. The two parts of the device are applied to one another in registering relation with the curved flange 20 of each part registering with the curved flange 24 of the other part and are then pressed together to cause the lip 26 upon each of the flanges 24 to effect a snap lock behind the shoulder 22 of the flange 20 of the other part, as seen in Fig. 3, and thereby position the parts with the annular flat parts 12 spaced slightly for any purpose desired as, for example, to accommodate therein a paper insert 28 describing or identifying the filamentary material wound on the device.

The device may be provided with additional means for centering the parts thereof. Thus, each of the annular inner flat parts 12, may have a flange 30 projecting therefrom and adapted to fit within the central opening of the opposite part, said flanges 30 each being of slightly less than 180 degrees in extent or in case a plurality thereof are provided, being spaced and arranged to accommodate therebetween a flange 30 of the other part. Flanges 30 preferably have a snug fit in the opening of the cooperating part, but if desired, may have lips comparable to the lips 26 on the flange 24 to supplement the interlocking action effected by the seating of lips 26 behind the shoulders 22, as above described.

While the parts are substantially similar or identical with respect to the properties mentioned above, they will differ from each other to a slight extent, as illustrated in Fig. 2, in that the inner annular wall portion 12 of one part will preferably be provided with a boss 32 projecting from the inner surface thereof intermediate the inner edge and the shoulder 14 of the part in which it is formed, said projection preferably being shallower than the projection of the flange 20 from part 12. The annular part 12 of the other section of the device has a slot 34 formed therein at a point spaced from but adjacent to the boss 32 when the two sections of the device are assembled together.

A cutter is provided in the device and includes a substantially flat end portion 36 of a metal plate positioned between the inner annular disc parts 12 of two sections of the device and preferably apertured to fit snugly upon the lug 32. It will be understood, however, that in some cases the lug 32 may be omitted and reliance placed solely upon the close spaced confronting relation of the parts 12 of the adjacent sections to position the plate part 36. In addition, a positioning function is served by the slot 34, which receives an intermediate plate portion 38 extending perpendicularly from the portion 36. The outer portion of the metal plate extends at some distance from the slot 34, substantially parallel to the adjacent annular portion 12, and preferably is longitudinally and substantially centrally slit so as to define an inner tongue 40 and an outer tongue 42, which tongues preferably are rounded at their free ends, as illustrated in Fig. 1. The tongues 40 and 42 preferably extend at an angle to each other and, as here shown in Fig. 2, one of the tongues, such as tongue 40 will preferably bear substantially flat against the outer surface of the annular inner part 12, while the other tongue, here shown as 42, will extend at an angle such that the inner surface thereof at its free end is spaced outwardly from the plane of the face of the outer surface of the part 40. The angular relation of the parts will preferably be such that a filament or strand may be inserted beneath the inclined tongue 42 and above the outer face of the tongue 40, and then manipulated by combined wedging and pulling action bearing against the inner edge of the inclined tongue 42 to use that edge as a cutting edge for the purpose of severing the strand or filament.

The outer annular portions 16 of the parts have a cross-sectional shape in a radial dimension substantially as illustrated in Fig. 3, and preferably such that the lips 18 thereof will contact slightly before the two parts of the device interlock by engagement of the lips 26 behind the shoulders 24 so that the operation of effecting the interlock entails flexing or distortion of the parts 16 so that they are maintained in tensioned condition after the interlock has been effected. Thus, the annular chamber between the parts 16 is normally held closed to confine the filamentary material and prevent it from unwinding or being released from the device unintentionally. At the same time this provides clamping means for clamping a free end of a filament so that the free end may be held by the device convenient for gripping by the user whenever that is desired. The gripping of the filament between the lips 18 is particularly advantageous in this device during the time that the cutter is being used to sever a section of the strand from the part coiled on the device in that it tends to hold or confine part of the strand immediately adjacent to the cutter so as to prevent following thereof with incident twisting, knotting or other adverse action. Also, it is possible by this arrangement to employ the inclined part 42 as a retainer under which the free end of the strand may be wedged while the part passing over the lip 18 is gripped at a secondary position, thus holding the entire exposed part of the strand taut and preventing it from engaging or looping about parts with which the spool may come in contact.

One of the merits of the device is that it is adapted to anchor the innermost end of the strand wound thereon. For this purpose an aperture 44 may be provided in the inner annular wall 12 of one section and the free end of a strand of the filamentary material may be passed therethrough from the inner face to the outer face thereof with the portion projecting from the outer face then held manually while the two sections are being snapped together to assemble them. The strand will preferably pass between the adjacent ends of sections 20 and 24 of the parts so as not to interfere with the snap interlock thereof. However, the thermo-plastic material of which the device is formed preferably possesses substantial resilience in thin cross-sections thereof so that if the filament should pass across one of the flanges 20, 24 of part having the opening 44 that fact will not prevent the interlocking of the sections except at and adjacent thereto, because the flexibility of the parts will permit the flanges 20, 24 to be deflected adjacent to the strand only and thence return to natural shape for interlock a short distance from the strand. The anchoring of one end of the strand between the cooperating parts makes the winding of the remainder of the strand a simple matter. In this connection, it may be mentioned that while the lips 18 are pressed together continuously by the tension of the walls 16, this tension is not sufficient to prevent winding of the strand upon the device since a pull upon the strand at an angle to the circular line of contact between the lips will spread the lips 18 to admit the strand therebetween progressively.

While the preferred embodiment of the invention has been illustrated and described, it will be understood that the changes in the construction may be made within the scope of the appended claims without departing from the spirit of the invention.

I claim:

1. A dispenser for filamentary material comprising two complementary registering parts interconnected to define a spool, at least one of said parts including a substantially flat central portion, a circular laterally projecting shoulder and an outer annular portion, said parts being interconnected adjacent said shoulder, the outer annular portions of said parts converging radially outwardly for substantially continuous peripheral tensioned engagement, the flat central portion of one of said parts having an aperture, and a cutter having a substantially flat end portion, an intermediate bent portion and an offset outer end portion having an angular projection with a cutting edge, said flat cutter end portion being confined between the central portions of said spool parts, said intermediate bent cutter portion passing through said aperture and said outer cutter portion extending alongside said apertured central spool portion, the major part of said outer cutter portion lying between the central spool portion and the plane of the outermost lateral projection of the adjacent spool part.

2. A dispenser as defined in claim 1 and anchor means for positioning the cutter end portion confined between said spool parts.

3. A dispenser as defined in claim 1, and a lug on one central spool portion, said confined cutter end portion having an aperture receiving said lug.

References Cited in the file of this patent

UNITED STATES PATENTS

| 515,790 | Porter | Mar. 6, 1894 |
|---------|--------|--------------|
| 643,544 | Simmons | Feb. 13, 1900 |
| 2,029,975 | Winchester | Feb. 4, 1936 |
| 2,494,106 | Rengo | Jan. 10, 1950 |
| 2,533,495 | Moffett | Dec. 12, 1950 |
| 2,664,194 | Sharp | Dec. 29, 1953 |